No. 673,718. Patented May 7, 1901.
E. G. MARQUARDT & F. H. JORDAN.
MEANS FOR FACILITATING THE MANUFACTURE OF COUCHES.
(Application filed Dec. 6, 1900.)
(No Model.) 2 Sheets—Sheet 1.
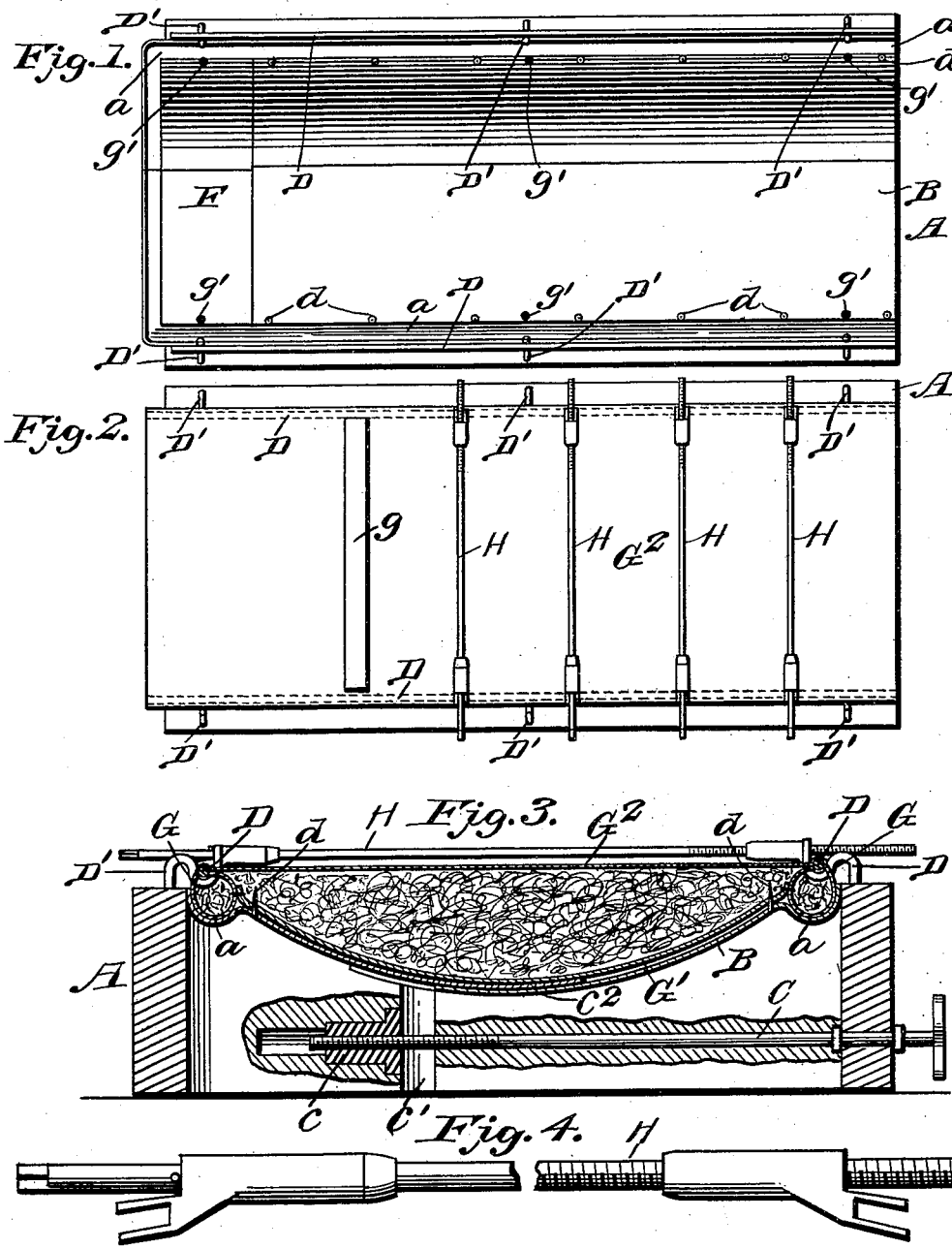
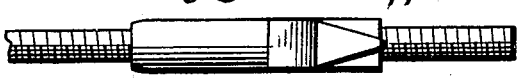
Witnesses
Edwin G. McKee
George M. Anderson
Inventors:
E. G. Marquardt
F. H. Jordan,
by E. W. Anderson
Attorney
THE NORRIS PETERS CO., PHOTO-LITHO., WASHINGTON, D. C.

No. 673,718. Patented May 7, 1901.
E. G. MARQUARDT & F. H. JORDAN.
MEANS FOR FACILITATING THE MANUFACTURE OF COUCHES.
(Application filed Dec. 6, 1900.)
(No Model.) 2 Sheets—Sheet 2.
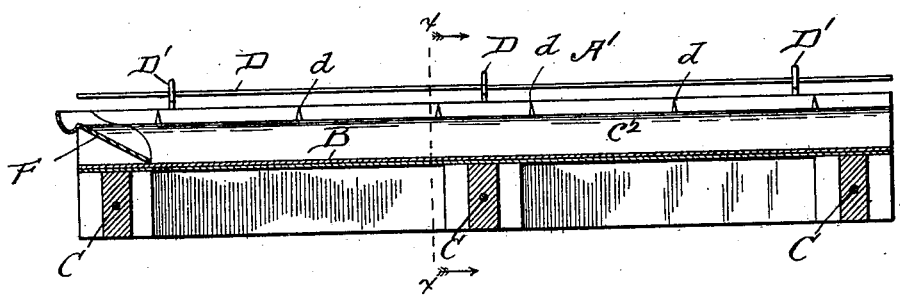
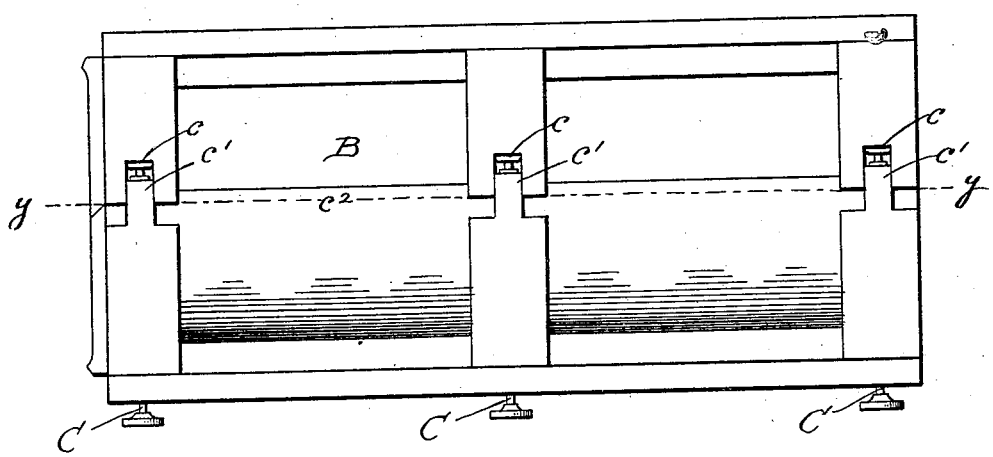
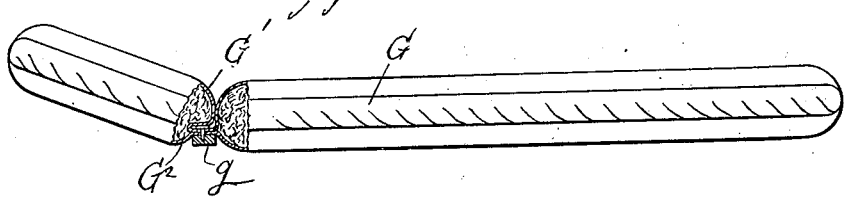
WITNESSES.
George M. Anderson
Jos. Gregory
INVENTORS-
E. G. Marquardt,
F. H. Jordan,
by E. M. Anderson
their ATTORNEY.

UNITED STATES PATENT OFFICE.

EDWARD G. MARQUARDT AND FRED H. JORDAN, OF BURLINGTON, IOWA.

MEANS FOR FACILITATING THE MANUFACTURE OF COUCHES.

SPECIFICATION forming part of Letters Patent No. 673,718, dated May 7, 1901.

Application filed December 6, 1900. Serial No. 38,910. (No model.)

*To all whom it may concern:*

Be it known that we, EDWARD G. MARQUARDT and FRED H. JORDAN, citizens of the United States, and residents of Burlington, in the county of Des Moines and State of Iowa, have made a certain new and useful Invention in Means for Facilitating the Manufacture of Couches; and we declare the following to be a full, clear, and exact description of the same, such as will enable others skilled in the art to which appertains to make and use the invention, reference being had to the accompanying drawings, and to letters of reference marked thereon, which form a part of this specification.

Figure 1 is a plan view of the form. Fig. 2 is a plan view of the form with couch in place finished and ready for removal. Fig. 3 is a cross-section of couch and form upon the line $x$ $x$, Fig. 6, the couch being finished and ready for removal. Fig. 4 is a detail view, partly broken away, of one of the cross-braces H. Fig. 5 is a bottom plan view of one of the wire-grippers of the cross-braces. Fig. 6 is a section on line $y$ $y$, Fig. 7. Fig. 7 is a bottom plan view of the form. Fig. 8 is a side elevation of the completed couch, partly broken away.

This invention has relation to means for facilitating the manufacture of couches; and it consists in the novel construction and combination of parts, all as hereinafter described, and pointed out in the appended claims.

Referring to the accompanying drawings, the letter A designates a rectangular framework or support having its upper surface concave, in accordance with the curvature of the top of the couch, and provided with longitudinal grooves $a$ at its sides, such upper surface and grooves being covered or lined with suitable sheet metal B. This framework, which will be termed the "form," and its lining are divided longitudinally into two sections, adjustable with relation to each other to regulate the width of the form by rotatable rods C, having bearings in one of said form-sections and having a screw engagement with metal socket-pieces $c$, secured in the other of said sections of the form. The cross-pieces of the two sections are shown as having tongue-and-groove connections $c'$ and the two sections of the lining thereof as having a lap-joint $c^2$.

At the outside edges of grooves $a$, a short distance above the form, are slender longitudinally-extending metal rods or wires D, removably supported in compound open hooks D', removably seated in the form. At the inside of each such groove $a$ project upwardly from the metal lining a row of sharp-pointed teeth $d$.

F represents a rise at one end of the metal lining to give the proper inclination to the head of the couch.

The manner of procedure is as follows: The two slender rods or wires D, which extend the full length of the form, are first placed in their supporting-hooks. A narrow strip of plush or other suitable material G is sewed centrally thereof to each longitudinal edge of the cover G' of the couch. (See Fig. 3.) Such cover G' and the bottom piece $G^2$ are now tacked to the cross-block $g$, located at the juncture of the body and head of the couch, (see Fig. 8,) afterward placed in the form-cover downward, and the longitudinal edges of the cover G' pressed down upon and secured by the pointed teeth $d$. The inner half of each strip G is next brought around over grooves $a$ and sewed at the edges thereof to rods or wires D. (See Fig. 3.) Filling material is placed upon said strips G, completely filling the grooves $a$, and the outer half of such strips is brought tightly over such filling and sewed to rods D, forming side rolls. The head and body of the couch are now properly stuffed, thoroughly pressed, and the bottom piece $G^2$ drawn across and sewed at its edges to rods D, transverse adjustable braces or stretchers H, connecting the rods or wires D, being at this point employed to hold the couch in form until it is secured upon its base. The rods D form a part of the completed couch. The ends of bottom piece $G^2$ and cover G' having been suitably sewed together, the pad or couch is lifted from the form, turned right side up, and secured upon its base, which is provided with springs.

The above-described devices and method are employed for making couches having lateral rolls; but by removing compound hooks D' from their seats, referred to, and placing them in openings g' upon the inside of grooves a couches without lateral rolls may be formed, side strips G being of course omitted.

The wires or rods C may be divided at the juncture of couch head and body to allow such head to be bent upwardly.

Having thus described our invention, what we claim as new, and desire to secure by Letters Patent, is—

1. Means for facilitating the manufacture of couches, consisting of a form, rods or wires supported above said form, longitudinally and laterally thereof, and rows of pointed teeth projecting from said form laterally thereof, together with transverse adjustable braces connecting said rods, substantially as specified.

2. Means for facilitating the manufacture of couches, consisting of a two-part concave form having a sheet-metal lining, and grooves at the sides thereof, slender rods or wires supported above said form at the outside of said grooves, rows of pointed teeth projecting from said form at the inside of said grooves, transverse adjustable braces connecting said rods or wires, and means for adjusting the two parts of said form with relation to each other, to alter the width thereof, substantially as specified.

3. Means for facilitating the manufacture of couches, consisting of a two-part concave form having a tongue-and-groove connection, a two-part sheet-metal lining for said form having a lap-joint, rows of pointed teeth at the sides of said form, rods or wires removably supported at the sides of said form, transverse adjustable braces connecting said rods or wires, and means for adjusting the sections of the form toward and away from each other, substantially as specified.

4. Means for facilitating the manufacture of couches, consisting of a two-part concave form having grooves at the sides thereof, the two sections of said form, having a tongue-and-groove connection, socket pieces or nuts in one of said form-sections, rods having rotatable bearings in the other of said form-sections, and provided with a screw-threaded engagement with said socket pieces or nuts to alter the width of the form, slender rods or wires supported above said form at the outsides of said grooves, rows of pointed teeth projecting from said form at the inside of said grooves, and a sheet-metal concave two-part lining for said form, having a lap-joint, together with transverse adjustable braces connecting said rods or wires, substantially as specified.

5. Means for facilitating the manufacture of couches, consisting of a concave form having grooves at the sides thereof, compound hooks at the outside of said grooves, slender rods or wires supported above said form in said hooks, rows of pointed teeth at the inside of said grooves, and transverse adjustable braces connecting said rods or wires, substantially as specified.

In testimony whereof we affix our signatures in presence of two witnesses.

EDWARD G. MARQUARDT.
FRED H. JORDAN.

Witnesses:
C. W. MARQUARDT,
HERMAN MARQUARDT.